United States Patent
Ziske

(10) Patent No.: US 6,485,544 B1
(45) Date of Patent: Nov. 26, 2002

(54) PARALLEL FOLDED FILTER

(75) Inventor: Olaf Ziske, Klein-Rönnau (DE)

(73) Assignee: Dräger Sicherheitstechnik GmbH (DE)

( * ) Notice: Subject to any disclaimer, the term of this patent is extended or adjusted under 35 U.S.C. 154(b) by 87 days.

(21) Appl. No.: 09/599,208

(22) Filed: Jun. 22, 2000

(30) Foreign Application Priority Data

Oct. 16, 1999 (DE) .......................... 199 50 067

(51) Int. Cl.$^7$ .......................... B01D 46/52; B01D 27/06; B01D 29/07
(52) U.S. Cl. .......................... 95/273; 95/283; 55/497; 55/500; 55/502; 55/511; 55/521; 55/DIG. 5; 156/227; 156/256; 156/305
(58) Field of Search .......................... 55/495, 497, 500, 55/502, 503, 511, 521, 529, DIG. 5, DIG. 33, DIG. 35; 428/103, 174, 181, 182, 200; 128/205.27, 205.29, 206.12, 206.16; 156/226, 227, 256, 305; 95/273, 283

(56) References Cited

U.S. PATENT DOCUMENTS

| | | | | |
|---|---|---|---|---|
| 2,032,262 A | * | 2/1936 | Cori | 55/497 |
| 2,206,684 A | * | 7/1940 | Yant | 55/521 |
| 3,853,529 A | * | 12/1974 | Boothe et al. | 55/521 |
| 3,871,851 A | * | 3/1975 | Neumann | 55/521 |
| 4,169,059 A | * | 9/1979 | Storms | 55/497 |
| 4,199,387 A | * | 4/1980 | Hladik | 55/DIG. 5 |
| 4,976,857 A | * | 12/1990 | Solomon | 55/521 |
| 5,063,926 A | * | 11/1991 | Forsgren et al. | 55/DIG. 35 |
| 5,098,767 A | * | 3/1992 | Linnersten | 55/521 |
| 5,207,989 A | * | 5/1993 | MacNeil | 55/502 |
| 5,273,560 A | * | 12/1993 | Kadoya et al. | 55/521 |
| 5,512,172 A | * | 4/1996 | Marble | 55/521 |
| 6,146,449 A | * | 11/2000 | Lee et al. | 55/DIG. 33 |
| 6,179,891 B1 | * | 1/2001 | Knudsen et al. | 55/511 |

FOREIGN PATENT DOCUMENTS

DE    1 275 870    8/1968

* cited by examiner

*Primary Examiner*—Duane Smith
*Assistant Examiner*—Jason M. Greene
(74) *Attorney, Agent, or Firm*—McGlew and Tuttle, P.C.

(57) ABSTRACT

A parallel folded filter has good sealing properties between the folded filter web and the filter housing with the smallest possible amount of sealant. The filter is prepared with an elliptical filter blank, in which the rows (1) of fold lines (locations of predefined fold edges or imaginary fold edges) are at right angles to an axis (4) extending in the direction of the greatest longitudinal extension of the filter blank (2). The circumferential contour of the filter blank (2) is dimensioned such that it assumes a circular shape with the folds stood up (e.g., in a folded state). An adhesive bead (3) is applied along the circumferential contour. A ring-shaped filter housing accommodates the folded filter blank (2) such that a circumferential support surface is present for the adhesive bead (3).

16 Claims, 2 Drawing Sheets

PARALLEL FOLDED FILTER

FIELD OF THE INVENTION

The present invention pertains to a parallel folded filter with a folded filter blank and to a process for preparing a parallel folded filter.

BACKGROUND OF THE INVENTION

In a parallel folded filter known from the state of the art, a folded filter web is led on both sides to tubular nozzles, by which a self-curing plastic is pressed into the filter web. A plastic ring, which traverses the filter web, is formed upon curing the plastic, as a result of which a tight closure is formed between the plastic ring and the filter web. The filter material located outside the plastic ring is subsequently cut off, so that a round folded filter insert is left, which can be inserted into a corresponding filter housing.

A relatively large amount of plastic is needed in the prior-art parallel folded filter to completely fill out the edge area between the folds. In addition, the removal of the filter insert from the tubular nozzles is made difficult by adhesion effects of the plastic on the inner walls of the tubular nozzles. A parallel folded filter of this type has been known from DE-PS 12 75 870.

In other prior-art parallel folded filters, the folded filter web is first inserted into a filter housing and liquid sealant is then fed in while rotating the filter housing. The sealant is distributed on the inner wall of the filter housing due to the centrifugal force and seals the filter web against the housing. Such a filter is expensive to manufacture and a relatively large amount of sealant is needed, because the entire inner surface of the filter housing must be wetted with sealant.

SUMMARY AND OBJECTS OF THE INVENTION

The basic object of the present invention is to improve a parallel folded filter such that good sealing is achieved between the folded filter web and the filter housing with the smallest possible amount of sealant.

According to the invention, a parallel folded filter is provided with a prefolded blank providing a flat elliptical filter blank with fold lines. The rows of fold lines of the filter blank extend at right angles to an axis extending in the direction of the greatest longitudinal extension of the filter blank. A circumferential contour of the filter blank is dimensioned such that the filter blank assumes a circular shape with the fold formed along the fold lines (a stood up fold position). An adhesive bead extends along a circumferential contour. A ring-shaped filter housing is provided with an inner contour designed to accommodate the folded filter blank. The filter housing has a circumferential support surface for the adhesive bead.

According to another aspect of the invention, a process is provided for preparing a parallel folded filter. A filter blank with fold lines (prefolded) is prepared, in which the rows of fold lines are directed at right angles to an axis extending in the direction of the greatest longitudinal extension of the filter blank. The circumferential contour of the filter blank is dimensioned such that it assumes a circular shape with the folds stood up. An adhesive bead is applied along the circumferential contour. With the folds stood up (i.e., with the fold formed along the fold lines), the filter blank is placed into a ring-shaped filter housing, whose inner contour is designed as a support surface for the adhesive bead.

The advantage of the present invention is essentially that the sealant is applied only in the areas of the filter blank where it is needed for sealing against the filter housing. To prepare the filter blank, an elliptically extending adhesive bead is first sprayed onto a flat filter web, with fold lines based on a prefold. The filter web is then stood up (i.e., with the fold formed along the fold lines) and the filter blank is cut out of the filter web along the outer edge of the adhesive bead.

The circumferential contour of the adhesive bead is dimensioned such that with the folds stood up, a circular shape is obtained for the filter blank. In addition, the adhesive bead is positioned on the filter web such that the rows of folds extend at right angles to the axis of the greatest longitudinal extension of the filter blank. A plurality of filter blanks may be arranged next to one another or one behind the other on a filter web, so that the filter web can be utilized without appreciable waste. The filter blank is then inserted into a filter housing, and the adhesive bead extends in a zigzag pattern over the area of the inner surface of the filter housing.

In addition to the adhesive bead, the filter blank is advantageously also provided with individual bead-like adhesive tracks, which extend in parallel to the axis of the greatest longitudinal extension and act as spacers for the folds.

The process according to the present invention for preparing a parallel folded filter is characterized by the following steps:

a flat, filter blank is prepared with fold lines (preferably based on a previous fold or prefold), in which the rows of fold lines extend at right angles to an axis extending in the direction of the greatest longitudinal extension of the filter blank, the circumferential contour of the filter blank is dimensioned such that it assumes a circular shape with the folds stood up, an adhesive bead is applied along the circumferential contour and the filter blank with the folds stood up is placed into a ring-shaped filter housing.

A further advantageous step of the process may be provided including heating the filter housing with the folded filter blank inserted to the melting point of the adhesive, as a result of which the adhesive bead becomes attached to the inner surface of the filter housing. Complete sealing of the edge of the filter blank against the filter housing is achieved as a result. The connection between the adhesive and the inner surface of the housing is supported by rotating the filter housing during the heating.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
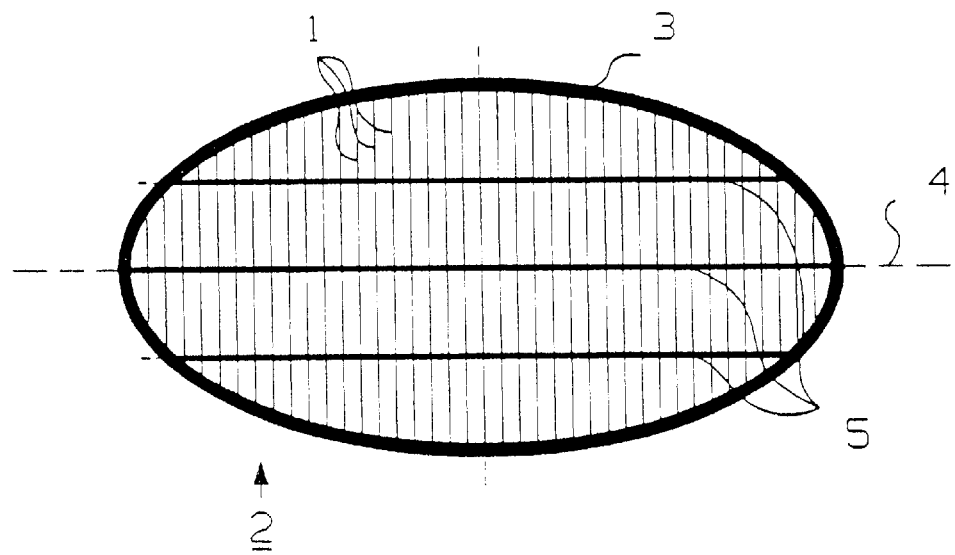
FIG. 1 is a top view of a filter blank with fold lines.

Referring to the drawings in particular, FIG. 1 schematically shows a top view of a filter blank 2 provided with rows 1 of fold lines with an adhesive bead 3 extending along the circumferential contour. The fold lines may be formed based on a prefold, where the filter blank 2 is elliptical in a flat state. The fold lines may be locations where the web is to be folded (imaginary—based on the intended location of the fold edge). The elliptical circumferential contour of the filter blank 2, shown flat in FIG. 1, is dimensioned such that a circular shape is obtained after folding up the rows along the fold lines. A filter web may be provided with the adhesive bead 3 extending along the elliptical circumferential contour. The filter web is then stood up (i.e., with the filter blank in a folded state, with folds 6 formed based on fold lines 1) and the filter blank 2 is cut out of the filter web along the outer edge of the adhesive bead, e.g., in the circular shape shown in FIG. 2.

Figure 2:
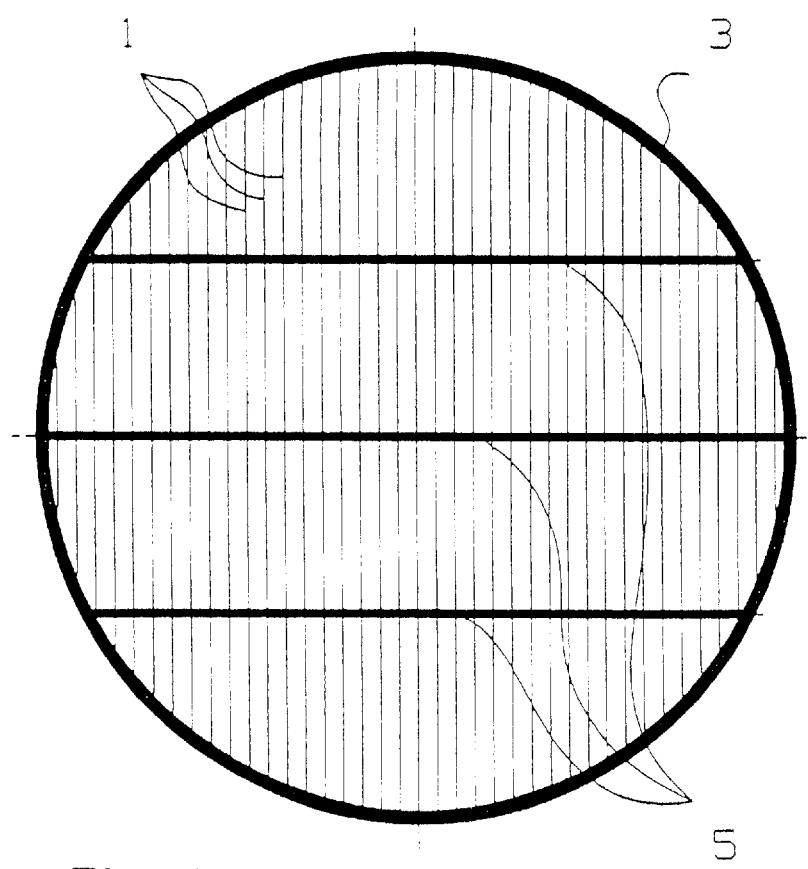
FIG. 2 is a top view of the folded filter blank according to FIG. 1 shown at an enlarged scale and also showing regions for adhesive tracks.
Figure 3:
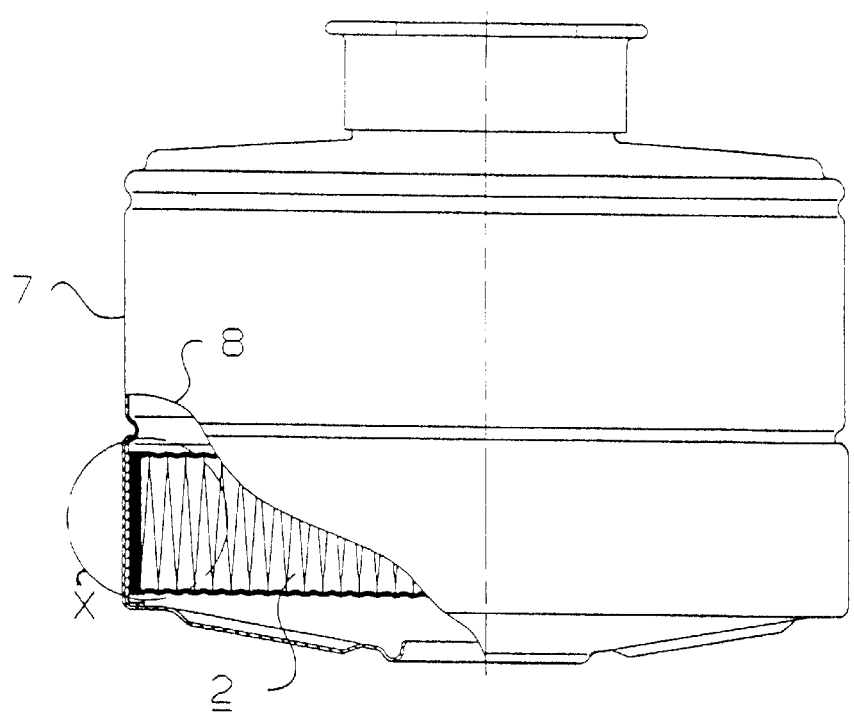
FIG. 3 is a side view of a filter housing with the filter blank according to FIG. 2.

The rows 1 of fold lines are directed at right angles to an axis 4 extending in the direction of the greatest longitudinal extension. Adhesive tracks 5 are provided extending in parallel to the axis 4. The adhesive tracks may be on one or both sides and extend uninterrupted in the track region or extend interrupted in the track region The adhesive tracks 5 are in contact with one another after standing up the filter blank 2, namely making the folds 6 along the fold lines. Adhesive tracks 5 are provided as spacers for the folds 6 as shown in FIG. 3. The adhesive tracks 5 can continue in an interrupted form along either of the top surface or the bottom surface of the material of the filter blank 2. The stood-up filter blank 2, i.e., the filter blank with folds 6 formed based on fold lines 1, is shown in FIG. 2. Identical components are designated by the same reference numbers as in FIG. 1.

FIG. 3 shows a side view of a filter housing 7 with inserted filter blank 2, wherein the filter housing 7 is partially cut away along a break line 8. Identical components are designated by the same reference numbers as in FIG. 1.

Figure 4:
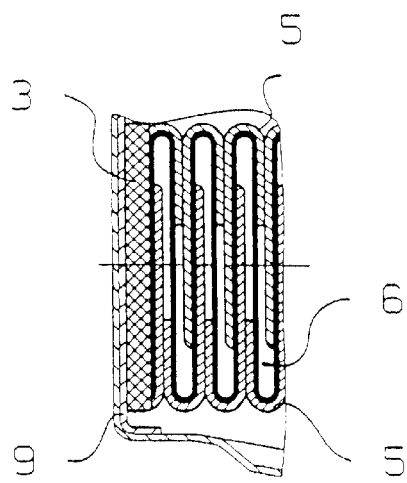
FIG. 4 is an enlarged view of the detail "x" from FIG. 3.

FIG. 4 shows detail "x" from FIG. 3. The adhesive bead 3 of the filter blank 2 is in contact in the filter housing 7 along cylindrical inner surface 9. The cylindrical inner surface 9 of the filter housing 7 acts as a support surface. The cylindrical inner surface 9 is fixed to the adhesive bead over the entire circumference of the filter housing 7. The adhesive bead 3 of the filter blank 2 extends in a zigzag pattern over the area of the inner surface 9 of the filter housing 7. In FIG. 4, the full dimension of the adhesive bead 3 is shown in contact with the inner surface 9. In other locations (not shown in FIG. 4) only a small region of the adhesive 3 is in contact with the inner surface 9. This region has the zigzag line shape. By heating the filter housing 7 to a temperature at which the adhesive of the adhesive bead softens, complete sealing of the filter blank 2 against the inner surface 9 can be achieved. Parallel folded filters thus prepared can be used especially in conjunction with respirators or gas masks (not shown in the figures).

While a specific embodiment of the invention has been shown and described in detail to illustrate the application of the principles of the invention, it will be understood that the invention may be embodied otherwise without departing from such principles.

What is claimed is:

1. A parallel fold filter, comprising:
    an elliptical flat filter blank with rows of fold lines extending at right angles to an axis extending in the direction of a greatest longitudinal extension of said elliptical flat filter blank;
    a circumferential contour of said filter blank that is dimensioned such that said filter blank assumes a circular shape when said filter blank is folded, with folds formed along said fold lines;
    an adhesive bead extending along the circumferential contour; and
    a ring-shaped filter housing having an inner contour accommodating said folded filter blank and having a circumferential support surface in contact with said adhesive bead.

2. The parallel folded filter in accordance with claim 1, wherein said filter blank is provided with adhesive tracks extending in parallel to the said axis extending in the direction of a greatest longitudinal extension of said elliptical flat filter blank, said adhesive tracks acting as spacers for said folds.

3. The process for preparing a parallel folded filter, comprising the steps of:
    preparing a filter blank, in which rows of fold lines are directed at right angles to an axis extending in the direction of the greatest longitudinal extension of the filter blank in a non-folded flat state;
    dimensioning a circumferential contour of the filter blank such that it assumes a circular shape in a folded state of the filter blank;
    applying an adhesive bead along the circumferential contour;
    positioning the filter blank into a ring-shaped filter housing with the adhesive bead being on the filter blank in a folded state, the ring-shaped filter housing having an inner contour forming a support surface for contacting the adhesive bead.

4. The process in accordance with claim 3, wherein the filter housing is heated to the melting point of the material of the adhesive bead.

5. A parallel fold filter, formed by the process steps comprising:
    providing an elliptical flat filter blank with rows of fold lines extending at right angles to an axis extending in the direction of a greatest longitudinal extension of the elliptical flat filter blank;
    providing a circumferential contour of the filter blank that is dimensioned such that the filter blank assumes a circular shape when the filter blank is folded, with folds formed along the fold lines;
    applying an adhesive bead along the circumferential contour;
    providing a ring-shaped filter housing having an inner contour defining a circumferential support surface;
    disposing the folded filter blank in the housing with the adhesive bead in contact with the circumferential support surface.

6. The parallel folded filter in according to claim 5, wherein said filter blank is provided with adhesive tracks extending in parallel to the said axis extending in the direction of a greatest longitudinal extension of said elliptical flat filter blank, said adhesive tracks acting as spacers for said folds.

7. The parallel folded filter in according to claim 5, wherein the filter housing is heated to the melting point of the material of the adhesive bead.

8. A parallel folded filter in accordance with claim 5, wherein:
    said adhesive bead is applied to the flat filter blank before said disposing of the folded filter blank in the housing.

9. A parallel fold filter in accordance with claim 5, wherein:

said adhesive bead forms a zigzag line shape on said inner contour of said housing.

10. A process for preparing a folded filter, the process comprising the steps of:

providing a flat filter blank;

applying an adhesive bead in a circumferential contour on the flat filter blank, said circumferential contour having a shape on said flat filter blank to have said circumferential contour create a circular shape in a folded state of the filter blank and to have the circumferential contour have a longitudinal axis extending in a direction of a greatest longitudinal extension of the circumferential contour;

folding the flat filter blank along rows of fold lines directed at substantially right angles to said longitudinal axis;

providing a ring shaped filter housing with an inner contour;

arranging the folded filter blank into the ring-shaped filter housing;

connecting said inner contour to the adhesive bead.

11. A process in accordance with claim 10, wherein:

said flat filter blank is provided larger than said circumferential contour, and said filter blank is shaped to said circumferential contour after said applying of said adhesive bead.

12. A process in accordance with claim 11, wherein:

said filter blank is shaped to said circumferential contour after said folding.

13. A process in accordance with claim 10, wherein:

said flat filter blank is provided as being shaped to said circumferential contour.

14. A process in accordance with claim 10, further comprising:

applying adhesive tracks on said flat filter blank, said adhesive tracks extending in parallel to said longitudinal axis and creating spacers for said folds.

15. A process in accordance with claim 14, wherein:

portions of said adhesive tracks contact each other after said folding.

16. A process in accordance with claim 10, wherein:

said connecting includes heating the filter housing to soften the adhesive bead.

* * * * *